United States Patent [19]

Molby

[11] 4,215,547
[45] Aug. 5, 1980

[54] HYDROSTATIC SYSTEM WITH OVER CONTROL COMPENSATION

[75] Inventor: Lloyd A. Molby, Longview, Tex.

[73] Assignee: ATP Inc., Longview, Tex.

[21] Appl. No.: 950,404

[22] Filed: Oct. 11, 1978

[51] Int. Cl.² ............................................. F16H 39/46
[52] U.S. Cl. ........................................ 60/465; 60/487; 74/594.4
[58] Field of Search .................. 60/451, 452, 465, 487; 74/560, 594.4

[56] References Cited

U.S. PATENT DOCUMENTS

| | | | |
|---|---|---|---|
| 2,161,439 | 6/1939 | Thoma | 60/451 |
| 2,257,724 | 10/1941 | Bennetch | 60/451 X |
| 2,262,563 | 11/1941 | Stacy | 60/452 X |
| 2,976,685 | 3/1961 | Thoma et al. | 60/431 |
| 3,117,420 | 1/1964 | Young | 60/385 |
| 3,327,475 | 6/1967 | Clark et al. | 60/444 X |
| 3,660,975 | 5/1972 | Martin et al. | 60/447 |
| 3,943,712 | 3/1976 | Stuhr | 60/452 X |
| 4,100,738 | 7/1978 | Seaberg | 60/327 |

Primary Examiner—Edgar W. Geoghegan
Attorney, Agent, or Firm—Wofford, Fails & Zobal

[57] ABSTRACT

This specification discloses an off-road type vehicle employing an improved hydrostatic drive system having a variable displacement pump having an actuating member for varying displacement in at least one direction, wheel motors representing actuatable devices operable by fluid from the pump, hydraulic reservoir, serially interconnecting supply and return lines and an improvement comprising an over control compensation that includes high pressure relief valves on the high pressure supply lines; a neutralizing means for moving the actuating member back toward its neutral position responsive to hydraulic pressure released by the relief valves, and a bleed-off means connected with the neutralizing means and adapted to bleed-off high pressure hydraulic fluid to allow restoring operation and a bleed-off return for returning the bleed-off hydraulic fluid to the reservoir. Also disclosed are preferred embodiments in which the actuating member includes a pair of pedals for forward and reverse controls with respective means preventing operation of more than one pedal at a time and pedal travel limit stop, as well as a preferred linkage for operator comfort.

8 Claims, 7 Drawing Figures

U.S. Patent  Aug. 5, 1980  Sheet 1 of 3  4,215,547
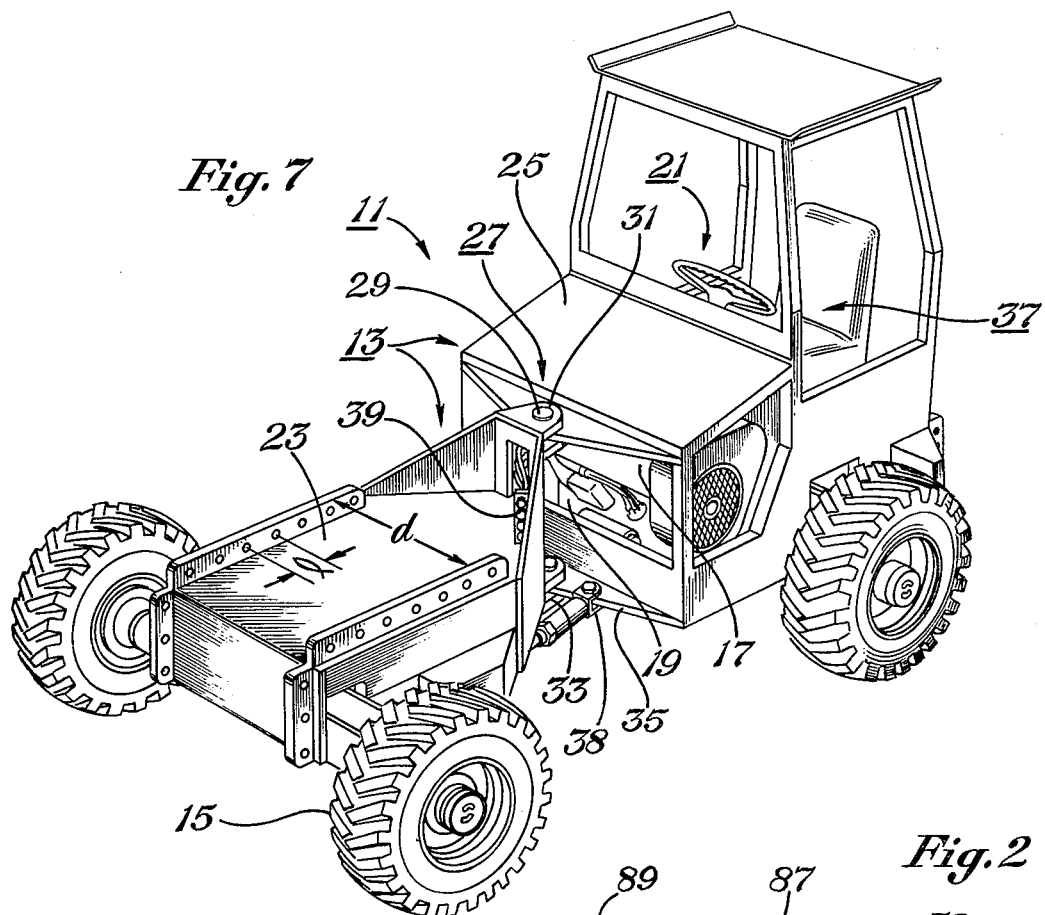
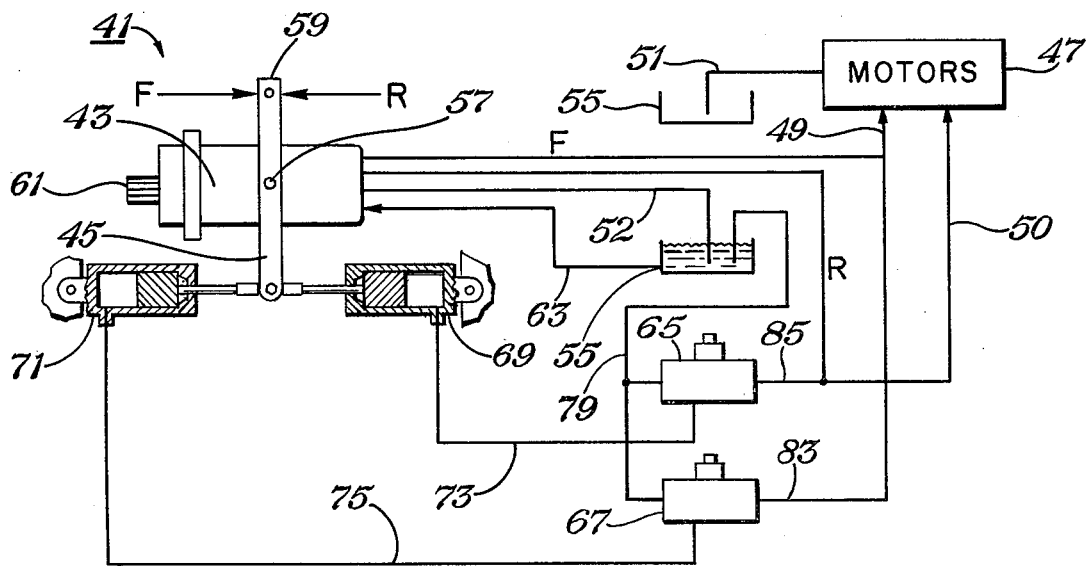

HYDROSTATIC SYSTEM WITH OVER CONTROL COMPENSATION

BACKGROUND OF THE INVENTION

1. Field of the Invention

This invention relates to a vehicle of the so called "off-road" type. More particularly, this invention relates to a hydrostatic system, such as may be employed in the off-road type vehicle in which over control compensation is provided to prevent burning out relief valves, pumps or wasting power.

2. Description of the Prior Art

A wide variety of off-road type vehicles have been known in the Prior Art. Each of the type vehicles have been expensive and have employed mechanical drives, electrical drives, and more recently, hydrostatic drives. As described in my co-pending application entitled "Adaptable Combination of Vehicle and Attachments", Ser. No. 919,179 (PF-331), filed June 26, 1978, and my co-pending application entitled "Off-Road Vehicle that both oscillates and articulates," Ser. No. 934,586, filed Aug. 17, 1978, there is provided an adaptable expensive vehicle that can be used with a wide variety of attachments such as augers, dump beds, ditch digging equipment, back hoes, revolving jib cranes, fork lifts and the like to more fully utilize the vehicle; and to provide a vehicle that is highly flexible, highly maneuverable, and able to be employed with such a wide variety of attachments. In the latter application, the vehicle was both oscillating and articulating so as to provide a level platform for operating attachments. The descriptive matter of these two applications are incorporated herein by reference for details omitted herefrom.

The prior art has seen the development of other attempts to provide overcontrol compensation in such an off-road vehicle. United States patents such as the following illustrate the state of the art technology. U.S. Pat. No. 2,161,439 shows a variable displacement pump and motor with an output control having a positive output lever operated by pressure acting against a spring. U.S. Pat. No. 2,262,563 shows a hydraulic system in which high pressure causes a shift of a lever toward neutral to lessen the output. This system also prevents reversal beyond a minor amount until pressure in the system falls below a damaging shock pressure. U.S. Pat. No. 2,976,685 shows a variable power transfer employing (1) a pressure operated ram to change the moment arm of displacement control with respect to fulcrum on the operators lever; (2) a caged spring between displacement control and lever and also indicates there is a coconnected fuel regulator to unload the transfer pump if excessive load is placed on the engine. U.S. Pat. No. 3,078,674 shows a hydraulic control system for a variable displacement pump in which pressure greater than a predetermined maximum effects centering of a pump control to reduce pump output. It uses diametrically opposed rams to center a wobble plate. U.S. Pat. No. 3,117,420 shows a hydrostatic transmission in which a follow up valve is positioned so that responsive to a control valve, double acting motion moves the displacement control to a maximum position and gradually reduces it as needed. In this apparatus the chamber pressure can load or unload to decrease or increase speed. U.S. Pat. No. 3,163,115 limits the volumetric rate of flow without objectionable feed back to the manual system. Cylinder 85 and piston 84 position the fulcrum responsive to volume and pressure from pump 20. It is a complex system to control rudders and the like. U.S. Pat. No. 3,327,475 shows a control system with a means for slowing the vehicle rather than stalling the engine if the torque requirements become too high. U.S. Pat. No. 3,660,975 shows a hydrostatic transmission with an automatic pump displacement control, manual override to keep the displacement low and the device sensitive to the pump inlet pressure to render the override inoperative when the pump inlet pressure exceeds a maximum. Spool 28 opens ports to increase or decrease pump capacity as needed.

These patents and applications represent a significant advance in the art but have not been totally satisfactory in solving all of the problems in the prior art.

In the prior art vehicles, there have been problems with the electric drives and with the mechanical drives that made a hydrostatic drive system advantageous. Yet the hydrostatic drive system was disadvantageous in that with the high flow capacity of its pumps for driving the vehicle, damage can be done if there was over pressuring such as when the vehicle encountered an immovable obstacle or the like. Even when relief valves were employed to relieve the pressure and prevent major structural damage, the relief valves could burn up in a very short time. Moreover, the relieving of the pressure wasted the power that could be advantageously used in a different way.

Moreover, the Prior Art vehicles needed foot controls in which the controls could only be operated in a given direction and could not be overridden, even if there was a strong operator, to prevent damage and wasting power.

Further, it was desirable that the off-road type vehicles that employed dual foot controls have foot controls in which the pedal not being employed was not uncomfortable to the operator.

Thus, it can be seen that the prior art was not totally satisfactory in providing an off-road vehicle that solved the deficiencies of the prior art in providing over control compensation, and allowing only one direction of pedal movement without discomfort to the operator in the opposite movement of the opposite and temporarily unused pedal.

SUMMARY OF THE INVENTION

Accordingly, it is an object of this invention to provide a hydrostatic system having an over control compensation that alleviates the deficiencies of the prior art.

It is a specific object of this invention to provide an off-road vehicle having a hydrostatic system that provides over control compensation, allows only one direction of movement of foot controls by the operator without discomfort to the operator and thereby alleviates deficiencies of the prior art and prevents structural damage, even if there is a strong operator or the like.

These and other object will become apparent from the descriptive matter hereinafter set forth, particularly when taken in conjunction with the appended drawings.

In accordance with this invention there is provided in a hydrostatic system such as employed in an off-road vehicle, employing a variable displacement pump having an actuating means including an actuating member for varying displacement in at least one direction, a hydraulically actuatable device operable by fluid from the pump, a hydraulic reservoir, and serially interconnecting supply and return lines and an improvement comprising: (a) at least one high pressure relief valve on the at least one high pressure fluid supply line for relieving hydraulic pressure when it exceeds a predetermined pressure; (b) at least one neutralizing means for moving the actuating member back toward its neutral position responsive to hydraulic pressure; (c) neutralizing line connecting the relief valve with the neutralizing means for carrying the high pressure hydraulic fluid thereto when relieved by the relief valve; (d) bleed-off means connected wih the neutralizing means and adapted to bleed high pressure hydraulic fluid off to allow return to normal traction after operation of the neutralizing means responsive to the relief valve operation. Specifically, the bleed-off means allows restroking the actuating member so as to reach an operable equilibrium position commensurate with non-relieving operation of the device. A bleed-off return line is connected serially with the bleed-off means and the hydraulic reservoir for returning hydraulic fluid to the reservoir.

In specific embodiments, the actuating means employs pedals on an off-road vehicle employing the hydrostatic system, one of the pedals being a control for moving forward when depressed and the other being a control for moving rearward when depressed, the pedals operating the actuating member; and the neutralizing means includes hydraulic rams for returning a given pedal to its neutral position when over control is signaled, as when the vehicle encounters a load too heavy to match its forward or rearward progress.

In specific preferred embodiments, the respective pedals have two features. First, they are connected with a master control shaft by suitable linkages which allow full movement responsive to downward movement of the pedal from the neutral position but allow only a predetermined proportion, such as one half, movement in the upward position from the neutral position of the opposite pedal. Second, they have a limit stop that maintains tractive drive even during relief; the limit stop being set low enough to prevent cavitation or damage to the main pumps.

BRIEF DESCRIPTION OF THE DRAWINGS

FIG. 1 is a schematic view of a hydrostatic system in accordance with one embodiment of this invention.

FIG. 2 is a partial cross sectional view of a neutralizing means with a controlled bleed-off means that can be used in the embodiment of FIG. 1.

FIG. 7 is an isometric view of an adaptable off-road vehicle employing an embodiment of this invention.

DESCRIPTION OF THE PREFERRED EMBODIMENTS

Figure 3:
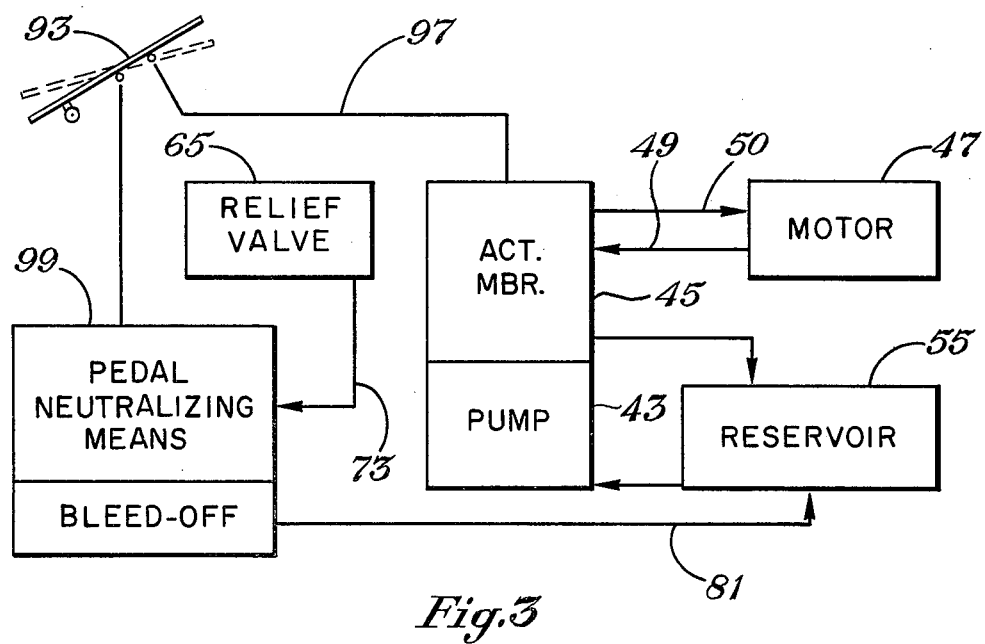
FIG. 3 is a block diagram schematic showing the application of this invention in an off-road vehicle, and employing sequencing relief-bleed-off valves.

This invention can be understood more clearly by referring to the figures in conjunction with the following descriptive matter. The adaptable off-road vehicle in which this invention is ultimately employed is illustrated in FIG. 7. Therein, the vehicle 11 has its frame 13 mounted on wheels 15. The frame 13 carries a prime mover 17 for powering the vehicle 11 and driving a power means, or power source, 19 for power and operating respective attachments. A steering means 21 is provided for steering the vehicle.

The vehicle 11 comprises a plurality of sections, including a front section 23 and a rear section 25. The vehicle 11 in the illustrated embodiment is an articulated vehicle, articulating about a central vertical axis 27. The axis 27 comprises a plurality of pins 29 inserted through respective apertures 31 in the respective clevises 33 and placed over the steering lug 35 with the apertures in alignment for receiving the pins 29.

The frame 13 is formed of suitably strong structural materials, such as steel or the like, that have been welded into place to support the respective elements in accordance with conventional engineering technology in this art. The rear section 25 encloses the operators console 37 having the usual controls, seat and the like.

The respective wheels 15 may comprise any of the usual types of wheels. As illustrated, they include hydraulic motor driven wheels with tires around the periphery. The hydraulic motors are connected with suitable controls, pump and reservoir in a hydrostatic system having at least conventional forward and rearward operating capability. The four wheels 15 are employed for supporting in a very stable manner each of the four corners of the frame 13.

The prime mover 17 is an internal combustion engine, specifically, a diesel in the illustrated embodiment. It drives the power means which comprise a pair of hydraulic pumps supplying high pressure hydraulic fluid for the hydrostatic drive system, as well as a hydraulic system for powering respective attachments.

Steering means 21 comprises the usual steering wheel and hydraulic ram, such as ram 38, that is fluidly connected with steering means 21 and operable to effect articulation of the frame about the central vertical axis 27.

Expressed otherwise, the basic vehicle 11 is a tractor that has a four-wheel drive and articulated power unit and is adapted to use remotely operated, hydraulically powered tools, or attachments, whether they are fastenable to the machine or used remotely therefrom. The hydraulic power unit can accommodate high pressure circuits from two gallons a minute up to eight gallons a minute on one or more of a plurality of hydraulic circuit fittings 39 that enable the hydraulic lines on the respective attachments to be plugged in, in the same way an electric plug may be plugged into a wall socket. The respective receptacles and plugs have respective valves immediately adjacent the ends for preventing unwanted flow when the fittings are unplugged. This facilitates hydraulic interconnection of the respective attachments such that both they and the hydraulic circuits on the vehicle remain filled with a hydraulic fluid.

The illustrated embodiment of this invention is available in either standard or heavy duty versions. The vehicle will handle up to about five thousand pounds on the fork lift attachment. As illustrated, the wheels in the heavy duty version employ tires that are nineteen inches wide. The vehicle steers ninety degrees total articulation, forty five degrees on either side of the longitudinal axis of the aligned section.

As illustrated, the vehicle 11 has means for oscillating, or levelling the front section, as described in the aforementioned patent application Ser. No. 934,586 (429F-15). Moreover, as described in the aforementioned patent application Ser. No. 919,179 (PF-331), the descriptive matter of which is incorporated herein by reference for details that are omitted herefrom, improved attachment means may be employed to facilitate mounting respective attachments.

A particularly advantageous feature of this invention is, however, the improved hydrostatic system employed therein. It is believed helpful to consider a schematic representation of the improvement of the hydrostatic system in order to facilitate understanding.

Referring to FIG. 1, the hydrostatic system 41 includes a variable displacement pump 43 having an actuating member 45, hydraulically actuable device 47, serially interconnecting supply and return lines 49-52, and a hydraulic reservoir 55.

The pump 43 is a variable displacement pump that is capable of putting out high pressure; for example, up to five thousand pounds per square inch gauge (psig). Illustrative of the type of pumps employed for pump 43 is a Sundstrand hydrostatic unit having a wobble plate with positive displacement type pistons for pumping the hydraulic fluid up to the high pressure. The wobble plate is then tilted by the actuating member to control the displacement of the pump for each revolution. Specifically, the actuating member 45 is a lever that is pivoted about the pivot shaft 57 and operable to tilt the wobble plate at the desired angle to obtain the desired displacement. The top of the lever 45 is connected as by shaft pin 59 with suitable control cables or linkage for moving it to the right for forward operation or to the left for rearward operation of the vehicle. The pump 43 is connected, as by shaft 61 with a prime mover for power, in turn driving the hydraulically actuated device 47.

The hydraulically actuatable devices 47 in the illustrated embodiment comprise hydraulic motors on the respective wheels that are driven in the respective forward and rearward direction. The motors are, in effect, constant displacement type motors to be driven at a rotational speed proportional to the amount of hydraulic fluid supplied to them such that variable control of the speed is effected by control of the actuating member 45. The motors 47 and the pump 43 may be matched, as in a Sundstrand matched unit for a hydrostatic power system. Of course any of the pumps and motors may be employed as desired as long as the pump is a variable displacement pump.

The pump and motors are connected by the respective interconnecting supply and return lines 49-52. As illustrated the supply lines 49, 50 are high pressure lines for supplying fluid at high pressure and returning it for powering the motors in the respective forward and reverse directions. The return lines 51, 52 may be low pressure lines for returning the low pressure case drain hydraulic fluid from the motors to the reservoir 55. The reservoir 55 is, ordinarily, a single reservoir with lines traversing thereto. In FIG. 1, the reservoir 55 is illustrated as a plurality of reservoirs for convenience. The purpose of the reservoirs are simply to store the hydraulic fluid and supply line 63 with hydraulic fluid to the inlet of pump 43. A charge pump may be employed, if desired.

The improvement in accordance with this invention is to supply high pressure relief valves 65, 67, neutralizing means 69, 71, neutralizing lines 73, 75, bleed-off means and bleed-off return lines.

The relief valves 65, 67 are adjustably set to relieve at a predetermined pressure; for example, about two hundred pounds per square inch gauge less than the maximum pressure of the system. To illustrate, the relief valves may be set to relieve at pressures of from twenty eight hundred to five thousand pounds per square inch gauge in order to prevent damage to the vehicle or the hydrostatic system. The relief valves are connected by respective lines 83, 85 with high pressure supply lines 49, 50 by a high pressure conduit, such as high pressure hose or the like.

The relief valves are, in turn, connected with the respective neutralizing means 69 and 71 by high pressure conduit, such as the high pressure hose, to enable conducting high pressure hydraulic fluids to power the neutralizing means 69, 71.

The neutralizing means 69, 71 are, in effect, hydraulic rams that are fluidly connected with the relief valves. The hydraulic rams comprising the neutralizing means 69, 71 are mechanically connected with the vehicle support. Each has a piston rod that abuts the lower end of the lever 45 serving as the actuating member so as to move it toward its neutral position shown in FIG. 1 responsive to its movement in a given direction to such an extent that the relief valves relieve high pressure hydraulic fluid to one of the neutralizing means 69 or 71. Each of the hydraulic rams has a cylinder 89 with piston 87 so placed that it bottoms out at the cylinder's end, corresponding to the actuating member's neutral position, shown by fillets 78, FIG. 2. This exact placement is necessary to prevent overshoot into the opposite flow direction of the pump, the latter creating havoc. The pistons, such as piston 87, FIG. 2, would tend to trap fluid pressure without the bleed-off means. The bleed-off means, thus, must bleed high pressure fluid from the neutralizing means 69, 71 to allow return to normal operation and prevent adding pressure to the relief pressure at which the relief valves relieve.

The bleed-off means may take any one of several forms. Even manually operated needle valves have been employed, although they are cumbersome. Early prototypes employed a controlled diameter orifice 77 in the piston 87, FIG. 2, for bleeding off the hydraulic fluid. The rate of bleed-off of the hydraulic fluid is slow enough to allow operation of the neutralizing means responsive to the high pressure hydraulic fluid relieved by the relief valve, yet fast enough to allow restroking of the actuating member so as to reach an operable equilibrium position commensurate with non-relieving operation of the motors 47. For example, the bleed-off orifice 77 may range in size from about 1/64 inch to as much as ⅛ inch or more if the supply lines 73, 75 are ¼ inch or larger. Of course, any suitable design can be employed depending on the overall capacity of the pump 43 and the operation of the hydrostatic system 41. When the controlled bleed-off orifice 77 is employed, a bleed-off return line, such as 81, connects the low pressure end of the cylinder 89 with the reservoir 55.

It has been found preferable to employ as the bleed-off means sequencing relief valves. With sequencing relief valves, excess pressurized fluid is first relieved to operate a ram and return the actuating member 45 toward neutral until a non-relieving condition exists. Each relief valve has an internal pilot and vent port. Each vent port is connected by bleed-off line 79 with reservoir 55. Following the stopping of relieving operation, the pressurized fluid is bled to the respective vent port to allow normal operation. This sequencing is effected by an internal piston that is moved to relieve excess high pressure fluid to the neutralizing means only but has an upper portion (in the vertical position) that connects the vent port with the neutralizing means port to bleed-off the fluid from cylinder 89, for example.

The cylinder 89 of each of the hydraulic rams comprising the neutralizing means 69, 71 will be structurally adequate to withstand the high pressure hydraulic fluid admitted thereto by the relief valves. Similarly, the pistons such as piston 87 are structurally adequate to return the control member 45 to its neutral position responsive to the hydraulic fluid vented to the neutralizing means by the relief valve.

The hydraulic fluid bled-off by the bleed-off means is then sent to the reservoir 55; for example, by way of discharge port 91, FIG. 2, and the respective return line 81 or through line 79, FIG. 1.

In operation, the actuating member 45 is moved in a predetermined direction; for example, the top thereof moved to the right in FIG. 1 to impart forward motion to the vehicle 11. High pressure fluid is sent by line 49 to the respective motors 47 to cause the vehicle to be moved forwardly. At such time as the vehicle encounters an object that resists further advancing in the forward direction, as by a front end loader encountering a large pile of material to be loaded, the motors tend to stall and the pressure to go up. When the pressure reaches a predetermined pressure; for example, about 4800 psig; the relief valve 67 opens, venting high pressure fluid through line 75 to the actuating means 71. The actuating means 71 supplies high pressure hydraulic fluid to the piston 87 moving the bottom end of the actuating member 45 back toward its neutral position, reducing the hydraulic flow from the pump 43. If relieving of the relief valve continues, the actuating member will be stroked back to its neutral position and reduce the output to zero at which time the relief valve will stop relieving.

The high pressure hydraulic fluid will bleed-off through either the bleed-off orifice 77 or the sequencing relief valve 67 and line 79 to the reservoir 55. If the control signal is continued to supply high pressure hydraulic fluid to the motors, the actuating member 45 will again be stroked to start supplying hydraulic fluid to the motor. If too much fluid is again supplied the relief valve will again relieve to move the actuating member 45 back to the neutral position. It may be that the vehicle 11 will have to be maintained in a static position without forward movement. On the other hand, it is possible that there will be some resistance encountered but that a non-relieving condition can be found such that the machine may move forward slowly to keep the hydraulic pump 43 stroked to put out a low amount of high pressure hydraulic fluid and move the vehicle forward slowly without relieving the relief valves.

In any event, a satisfactory condition is achieved, whether it is equilibrium operation or a series of sharp movements in one direction or the other.

FIGS. 3–6 illustrate the actual embodiment of FIG. 7.

Figure 4:
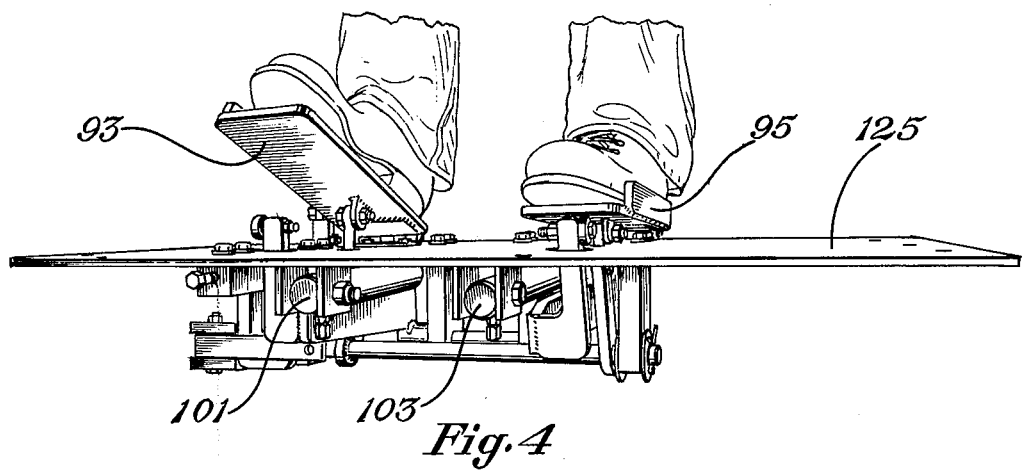
FIG. 4 is a partial perspective view of the control pedals of FIG. 3 with a left pedal depressed.
Figure 5:
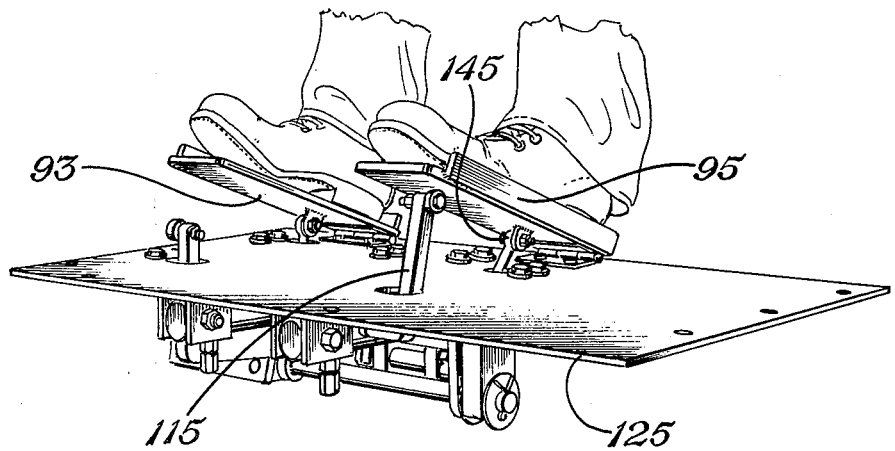
FIG. 5 is a partial perspective view of the control pedals of FIG. 4 with the control pedal being returned to neutral in accordance with this invention.
Figure 6:
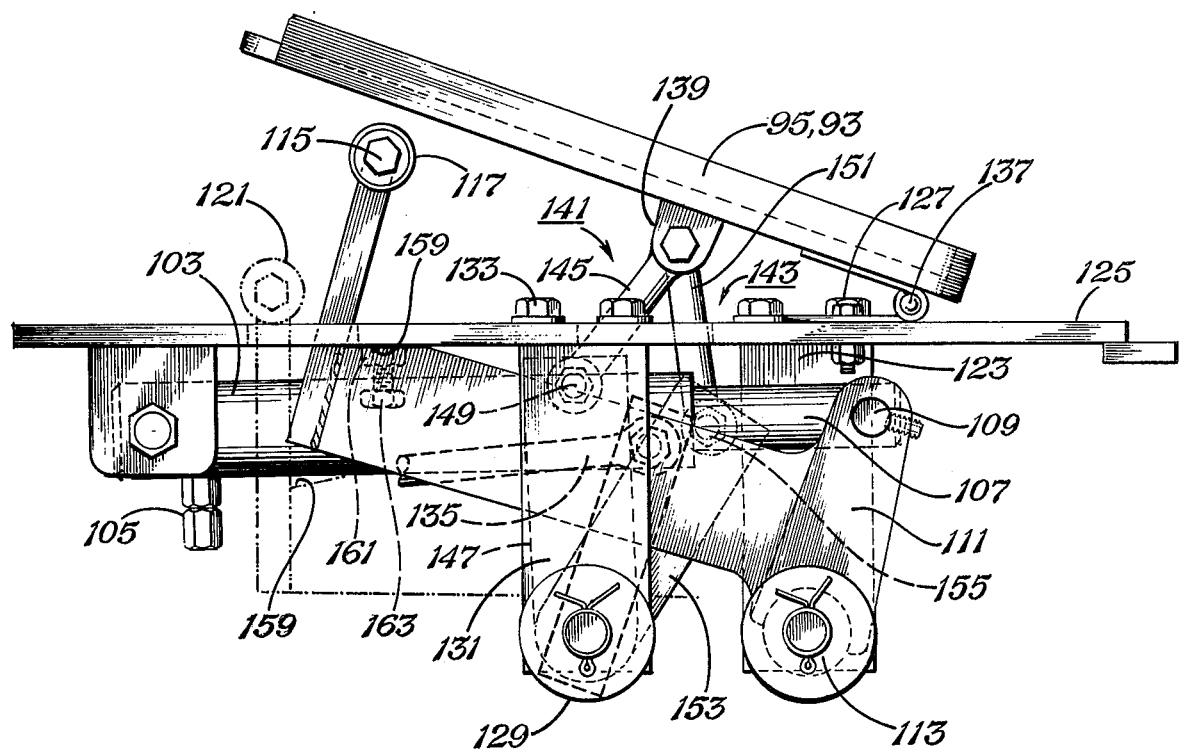
FIG. 6 is a partial side elevational view of the floor board pedals and interconnecting linkages of FIG. 4.

Referring to FIGS. 3–6, the actuating means includes member 45, FIG. 1, co-connected pedals 93, 95, FIGS. 3–5, that are operably connected to move the actuating member 45 in the respective forward and reverse directions when the pedals are depressed from the neutral position. Expressed otherwise, the pedals 93 and 95 are connected by suitable linkages, shown as line 97, FIG. 3, with the actuating member 45 on the pump 43. One of the pedals is provided for forward operation and one for rearward operation. For example, when the pedals are in a neutral position, the wobble plate of the pump is at its neutral position and zero hydraulic fluid is being pumped. Conversely, when the forward pedal is depressed from the neutral position, high pressure hydraulic fluid is put out proportionately to pedal depression through the forward high pressure line 49 to the motors 47. Conversely, when the rearward pedal is pushed, the wobble plate is moved in a reverse direction to effect a flow of high pressure hydraulic fluid in the hydraulic line 50 to motors 47 for rearward movement of the vehicle. As will be seen from descriptive matter later hereinafter set forth, the pedals are connected so as to effect control of the direction and magnitude of the output of at least one pump, illustrated as pump 43. Pedals are restored to the neutral position by pedal neutralizing means 99, FIG. 3. The neutralizing means comprise respective hydraulic rams 101, 103, FIG. 4, that are connected via high pressure conduits with the respective relief valves 65, 67; as described hereinbefore with respect to FIGS. 1 and 2. Specifically, the hydraulic ram 103, FIG. 6, is connected by way of fitting 105 with the high pressure hydraulic fluid from the relief valves, such as relief valve 67. The hydraulic ram 101 has a piston rod 107 that is connected, as by pin 109 with a bell crank 111. The bell crank 111 is pivotally mounted for movement about the shaft 113. Consequently, its free end 115 having thereon a roller 117 can be moved upwardly to the indicated position to return the pedal 93 to neutral. In normal repose, illustrated by dashed lines 121, the bell crank is out of the way of the pedal 93. The shaft 115 is mounted on a suitable structural bracket 123 that is affixed to the floor board 125 as by bolts 127.

The respective pedals 93, 95 are connected to the single stroking member 45 such that only one pedal can be depressed from the neutral position at a time so as to move the single stroking member, or actuating member, 45, in only one direction at a time. Specifically, each of the pedals 93, 95 are connected with a control shaft 129 that is connected with the free shaft pin 59 of the actuating member 45 so as to move the actuating member only in one direction at a time. Specifically, the control shaft 129 is pivotally mounted in the bracket 131 that is bolted to the floor board 125 by bolts 133. Th control shaft 129 is connected with the lever by any suitable means that will effect the respective positive movement of actuating member 45 in the respective directions. These controls may be any of the conventional controls, such as cables, levers, or combination of levers, cables, eccentric linkages, and the like. As illustrated, the shaft has a link 135, shown in dashed lines that is connected with the pin shaft 59 by a suitable rod connection. Consequently, when the shaft rotates, angular displacement causes forward or reverse movement of the rod, similarly causing forward or reverse movement of the top end of the actuating member 45 and the wobble plate of the pump 43.

The pedals 93, 95 are mounted for pivotal movement, as about a fulcrum shaft 137, FIG. 6. The respective pedals are connected by a bracket 139 near their mid point with the control shaft 129 via a dual linkage arrangement that allows full movement of the respective pedal from the neutral position downwardly but controls the backward movement of the opposite pedal from the neutral position upwardly at a predetermined proportion, such as $\frac{1}{2}$, of the downward movement of the pedal being used to impart control to the vehicle. Specifically, the dual linkage comprises a first and second linkage arrangement 141 and 143, respectively.

The first linkage arrangement 141 comprises first and second links 145 and 147. The first link 145 is pivotally connected to the bracket 139 on the pedal 95 and is pivotally connected, as at fulcrum pin 149 with the second link 147. The second link 147, in addition to being pivotally connected to the first link 145 is rigidly connected with the control shaft 129 so as to pivot in unison therewith.

The second linkage arrangement 143 comprises third link 151 and fourth link 153. Similarly as described hereinbefore, the third link 151 is pivotally connected with the bracket 139 on the pedal 93 and, at fulcrum pin 155 with the fourth link 153. The fourth link 153, in addition to being pivotally connected with the third link 151 is fixedly connected with the power shaft 129 so as to rotate in unison therewith.

It is noteworthy in the interconnection of the respective pedals that the second link 147 is connected so as to be nearly perpendicular to the floor board 125 so as to allow full, sensitive movement of the left pedal 95 for moving in its respective direction, such as forward, when depressed from the neutral position downwardly, yet will stroke the pedal from the neutral position upwardly only ½ as much as the opposite pedal is being moved downwardly. Conversely, the fourth link 153 is connected to the power shaft 129 at an angle making only about 60 degrees with respect to the floor board, at an acute angle, such that downward movement of the pedal 93 can be full, sensitive movement when moved from its neutral position downwardly for controling in its respective direction, such as rearwardly, yet only be stroked from the neutral position upwardly about ½ as much as the opposite pedal is moved downwardly in opposite control. This is for operator comfort. The exact angles will of course be varied as the length of the respective links are varied in the illustrated embodiment, the respective second and fourth links are longer than the respective first and third links by a proportion of about 5:3.8. Expressed otherwise, the ratio of the first to second links is about 0.76. Of course, the respective ratio of lengths and the respective angles of attachments to the control shaft may be varied to give the desired proportion of movement between the pedals. It has been found preferable to have the ratio of the length of the first and third links to the length of the second and fourth links, respectively, be at least 0.5, and better if in the range of 0.6-0.8.

In operation, a given pedal is moved for movement of the vehicle in the respective direction. In the embodiment of this invention, a charge pump is employed to supply make up hydraulic fluid in addition to the low pressure fluid return in the enclosed hydrostatic system. Yet, each of the respective pumps can pump up to 30 gallons a minute and there are two piston pumps. Consequently, the piston pumps would cavitate and in a matter of only several seconds, the piston pumps could burn up if the hydraulic flow is being relieved into the reservoir at a rate greater than supplied to the pumps. The device of this invention protects against such over control by neutralizing the actuating member 45. The relief valves 65, 67 may be set a few to several hundred pounds lower than the system pressure relief valve to protect against this cavitation. For example, the major system relief valve may be set at about 5,000 pounds and the neutralizing relief valve set at about 4,500 pounds per square inch gauge. While adjustable relief valves are employed in this invention, preset relief valves can be employed.

In any event, when the high pressure system is overloaded and the relief pressure exceeds the predetermined pressure, for example, 4,500 psig; the fluid is diverted through the relief valve into a single acting ram such as ram 101 or 103, FIGS. 4 and 6. The piston rod 107 is extended, moving the bell crank 111 from its free end at rest position 121, FIG. 6, to its restoring position 117 to restore the pedal to the neutral position. The high pressure hydraulic fluid is able, in this invention, to create about 1,000 pounds of force on the pedal to make sure that the operator can not override it. The action is essentially the same for both forward and reverse pedals. Once the pedal is restored to the neutral position, the pressure is relieved. The bell crank is constrained by the floor board 125 to the neutral position since, as illustrated in FIG. 6, its indent 159 encounters the floor board. Once the pedal is neutralized and the pressure is relieved, the relief valve closes. The hydraulic pressure bleeds-off the ram 103 and the bell crank 111 is allowed to return to the normal position and the operator can again stroke the particular pedal. Similarly as described hereinbefore the hydraulic fluid bled through the bleed-off means is returned to the reservoir through a suitable bleed-off return line.

If desired, a limit stop, such as welded nut and adjustable bolt 161, 163, dashed lines, FIG. 6, can be provided to limit return toward neutral position of a pedal and maintain a small tractive force. Such limit stops are placed and adjusted to prevent flow greater than the flow of fluid fed to the suction side of the pump.

Of course, the opposite pedal may be stroked by the operator if he wishes to back the vehicle up to again run at a particular pile of coal or the like that needs to be loaded by a front end loader or the like.

As will be appreciated from the foregoing, the respective hydraulic rams serving as a neutralizing means are single acting rams. The bleed-off means bleeds pressure from the high pressure ends. If desired, equivalent action could be obtained by any other equivalent mechanism.

In this invention, ordinary structural materials are employed and no exotic new materials are necessary. Of course, the most advantageous fittings, O-rings and the like may be employed to provide the requisite and conventional seals, sealing interconnecting fittings and the like.

From the foregoing, it can be seen that this invention achieves the objects delineated hereinbefore and provides an adaptable off road vehicle that employs an improved advantageous hydrostatic system for its motive control. Specifically, this invention prevents structural or hydrostatic system damage to the vehicle and provides over control compensation in a hydrostatic system that has been lacking heretofore. Particularly, this invention provides dual pedal controls that are operable in only one direction yet are returned to neutral position by overcontrol compensation means to alleviate the deficiencies of the prior art.

Although the invention has been described with a certain degree of particularity, it is understood that the present disclosure is made only by way of example and that numerous changes in the details of construction and the combination and arrangement of parts may be resorted to without departing from the spirit and the scope of the invention, as set forth in the appended claims.

What is claimed is:

1. In a hydrostatic system for at least one variable displacement pump having an actuating means including an actuating member for varying displacement in at least one direction, a hydraulically actuatable device operable by fluid from said pump, a hydraulic reservoir, and serially interconnecting supply and return lines, including at least a high pressure fluid power line for supplying high pressure fluid for operating said device in said at least one direction, the improvement comprising:

a. at least one high pressure relief valve connected in communication with said at least one high pressure fluid line for relieving hydraulic pressure greater than a predetermined first pressure;

b. at least one neutralizing means for moving said actuating member back toward its neutral position responsive to hydraulic pressure;

c. neutralizing line connecting said relief valve with said neutralizing means for carrying high pressure hydraulic fluid thereto when relieved by said relief valve;

d. bleed-off means connected with said neutralizing means and adapted to bleed high pressure hydraulic fluid from said neutralizing means to allow restroking said actuating member so as to reach an operable equilibrium position commensurate with nonrelieving operation of said device; and e. bleed-off return line connected serially with said bleed-off means and said hydraulic reservoir for returning hydraulic fluid to said reservoir.

2. The hydrostatic system of claim 1 wherein said pump and said device are operable in two directions equivalent to forward and rearward directions, said actuating member is movable from its said neutral position in two respective directions for varying displacement of said pump in said two directions, there are two respective high pressure fluid lines, one each for each respective direction; two respective relief valves are provided on respective said high pressure fluid lines; two respective neutralizing means are connected with respective said relief valves and said actuating member so as to return it towards neutral position when supplied with pressurized hydraulic fluid; and two bleed-off means are operably connected with respective neutralizing means and said hydraulic reservoir.

3. The hydrostatic system of claim 1 wherein said actuating member comprises two pedals, one for forward operation and one for rearward operation; said pedals are connected so as to effect control of direction and magnitude of output of said at least one pump, said pump is connected via forward and rearward high pressure fluid supply lines with respective motors powering wheels of a vehicle, said relief valves are connected respectively with said forward and rearward high pressure fluid supply lines; two restoring rams are operably coupled with said pedals so as to restore said pedals toward neutral position responsive to high pressure hydraulic fluid relieved by respective said relief valves; said neutralizing lines are connected respectively with said restoring rams and with said relief valves, said bleed-off means are operably connected in fluid communication with respective said restoring rams and said hydraulic reservoir.

4. The hydrostatic system of claim 3 wherein said restoring rams are connected to respective bell cranks, said bell cranks are pivotally mounted and each have one end disposed adjacent a respective said pedal so as to restore said pedal to its neutral position respective to high pressure hydraulic fluid.

5. The hydrostatic system of claim 3 wherein said pedals are connected with said actuating member and placeable in a neutral position such that only one pedal can be depressed at a time to move said single stroking member in a respective direction.

6. The hydrostatic system of claim 5 wherein said actuating member is operably connected with an operating shaft and respective said pedals are pivotally mounted and connected with said operating shaft by respective dual linkages comprising first and second linkages, said first linkage comprising first and second links that are pivotally connected together, said second link being connected fixedly to said operating shaft so as to pivot therewith and said first link being pivotally connected with said pedal; said second linkage comprising third and fourth links that are pivotally connected together, said fourth link being connected fixedly to said operating shaft so as to pivot therewith and said third link being pivotally connected with said pedal; said second and fourth links being connected with said operating shaft at respective predetermined angles off set with respect to each other such that said pedals are moved from neutral position upwardly only a predetermined proportion of and less than the amount the opposite pedal is moved from said neutralizing position downward in operation.

7. The hydrostatic system of claim 6 wherein said pedals are connected with said shaft with respective said second and fourth links being connected with said operating shaft at said predetermined angles off set with respect to each other such that one pedal is moved upwardly from neutral position only one half as much as the opposite pedal is moved downwardly from said neutral position in operation.

8. The hydrostatic system of claim 6 wherein a limit stop is provided for each bell crank to limit the return of the respective pedals toward neutral and maintain a small tractive effort in a given direction.

* * * * *